United States Patent [19]
Smith et al.

[11] Patent Number: 5,702,570
[45] Date of Patent: Dec. 30, 1997

[54] PROCESS OF PRODUCING SODIUM HYDROXIDE FROM SODIUM SULPHATE IN A PULP MILL

[75] Inventors: James W. Smith; Hoc Nghia Tran, both of Toronto, Canada

[73] Assignee: Thor Technology Corporation, North York, Canada

[21] Appl. No.: 273,628

[22] Filed: Jul. 12, 1994

Related U.S. Application Data

[63] Continuation of Ser. No. 932,557, Aug. 20, 1992, abandoned.

[30] Foreign Application Priority Data

Aug. 20, 1991 [GB] United Kingdom .................. 9117936

[51] Int. Cl.$^6$ ............................. D21C 11/00; D21C 11/04
[52] U.S. Cl. .................... 162/30.1; 162/30.11; 423/207
[58] Field of Search ................ 162/29, 30.1, 30.11; 423/207, DIG. 3

[56] References Cited

U.S. PATENT DOCUMENTS

| | | | |
|---|---|---|---|
| 2,275,792 | 3/1942 | Moseley | 23/185 |
| 2,518,530 | 8/1950 | Dooley | 23/185 |
| 3,107,142 | 10/1963 | Schoeffel et al. | 23/49 |
| 3,789,108 | 1/1974 | Rapson | 423/478 |
| 3,929,964 | 12/1975 | Thoma | 423/183 |
| 3,954,552 | 5/1976 | Lukes et al. | 162/17 |
| 4,000,264 | 12/1976 | Nagano et al. | 162/30 |
| 4,024,229 | 5/1977 | Smith et al. | 252/444 |
| 4,051,220 | 9/1977 | Coltrinari | 423/24 |
| 4,093,508 | 6/1978 | Henricson | 162/30 K |
| 4,153,502 | 5/1979 | Mueller | 162/17 |
| 4,198,385 | 4/1980 | Feldbaumer et al. | 423/566 |
| 4,253,911 | 3/1981 | Hillstrom et al. | 162/30 R |
| 4,288,286 | 9/1981 | Fuller | 162/30 R |
| 4,431,617 | 2/1984 | Farin | 162/30.1 |
| 4,526,760 | 7/1985 | Empie, Jr. | 162/30.1 |
| 4,668,342 | 5/1987 | Blackwell | 162/30.11 |
| 4,770,742 | 9/1988 | Bonsu | 162/29 |
| 4,855,123 | 8/1989 | Suzuki et al. | 423/562 |
| 4,919,914 | 4/1990 | Smith et al. | 423/224 |
| 4,981,556 | 1/1991 | Hedblom et al. | 162/29 |
| 5,034,094 | 7/1991 | Kurple | 162/30.11 |

OTHER PUBLICATIONS

Fogman, C. B. "The Lummus Pollution Controlled Polysulfide Recovery Proc.", 1972 Alkaline pulping Conf., pp. 1–11.
Hauki, T. "TRP in the Kraft Process: A new Application to improve the chemical balance," P & P Canada 85:2 (1984) pp. 31–35.
Mead Process, Markant, H.P. Tappi 43, 699 (1960).
Stora Kipparbergs, Cederquist, K.N., Tappi 43, 702 (1960).
Sivola Process, Pascoe, T.A., Tappi 42, 265 (1959).
Tampella Recovery Process, Hauki, T. Pulp & Paper Can. 85:2, 31 (1984).
Plasma Gasification, Bernhard, R., Pulp & Paper Can. 87:10, 64 (1986).
Alby Process, Wongria P. Nordic Pulp & Paper Res. 4, 192 (1988).
Cooling crystallization of green liquor, Henricson K. Pap. Proc. 57, 10, 643 (1973).
SCA–Billebud Recovery Process, Horntvedt E. Paper Trade J. 158, 16,32 (1974).
Development of the Eboria Process, Teder A Nord. Coll. 1, 2,12 (1984).

*Primary Examiner*—Peter Chin
*Assistant Examiner*—Dean T. Nguyen
*Attorney, Agent, or Firm*—Sim & McBurney

[57] ABSTRACT

Sodium hydroxide is formed from sodium sulphate by a three step operation comprising converting the sodium sulphate to sodium sulphide, converting the sodium sulphide to sodium bicarbonate, and converting the sodium bicarbonate to sodium hydroxide. The operations preferably are effected in conjunction with a bleached kraft pulp mill operation, so as to utilize by-product sodium sulphate from chlorine dioxide generation to produce useful sodium hydroxide as sulphur without co-producing chlorine.

13 Claims, 4 Drawing Sheets

PROCESS OF PRODUCING SODIUM HYDROXIDE FROM SODIUM SULPHATE IN A PULP MILL

This is a continuation of application Ser. No. 932,557 filed Aug. 20, 1992 now abandoned.

The present invention relates to the production of sodium bicarbonate, sulphur and, preferably, sodium hydroxide, particularly in a pulp mill environment.

BACKGROUND OF THE INVENTION

Chemical imbalance is a problem with the modern-day pulp mill. Units producing bleach plant chemicals are a prime source of this problem. Chlorine dioxide generators, providing chlorine dioxide for use as a bleach chemical, generally also produce sodium sulphate as a by-product. Some of this sodium sulphate can be used in the pulp mill to make up soda and sulphur losses from the pulp mill but tightening up of pulp mills to decrease effluents has reduced the need for sodium sulphate, leading to an excess of sodium sulphate production in relation to chlorine dioxide requirements.

In addition, when sodium hydroxide, used in the pulp mill bleach plant along with the chlorine dioxide, is produced by electrolysis, chlorine is co-produced. Almost all the supply of caustic soda in the world is produced in this manner. Such chlorine formerly was used in pulp mills in the bleaching process, but no longer is employed for such purpose in many pulp mills, resulting in an imbalance in the supply of chemicals to the pulp mill.

A search in the facilities of the United States Patent and Trademarks Office has been conducted with respect to the present invention. The following U.S. Pat. Nos. have been located as the most pertinent to the present invention:

| | | |
|---|---|---|
| 5,034,094 | 4,051,220 | 4,981,556 |
| 4,024,229 | 4,855,123 | 4,000,264 |
| 4,770,742 | 3,954,552 | 4,668,342 |
| 3,929,964 | 4,526,760 | 3,789,108 |
| 4,253,911 | 3,107,142 | 4,198,385 |
| 2,518,530 | 4,153,502 | 2,275,792 |

Most of this prior art relates to various manipulations in pulp mill operations. Of this prior art, U.S. Pat. Nos. 2,518,530, 3,107,142 and 5,034,094 are considered the most relevant to the invention described and claimed herein. With respect to this prior art:

(a) U.S. Pat. No. 2,518,530 describes the formation of sodium hydroxide from sodium sulphate by double-decomposition of the sodium sulphate with ammonium bicarbonate (formed from ammonia and carbon dioxide), thereby forming sodium bicarbonate, which then is converted into sodium hydroxide, and ammonium sulphate. The ammonium sulphate is reconverted to ammonia, producing by-product sulphur trioxide.

(b) U.S. Pat. No. 3,107,142 treats waste sulphite liquor (containing sodium sulphate and sodium carbonate) to form sodium hydroxide. The sodium hydroxide is formed by causticization of the sodium sulphate and sodium carbonate containing solution. Solids (containing sodium sulphate) are removed from the sodium hydroxide solution and reacted with barium carbonate, to produce sodium carbonate, which is recycled to provide a source of sodium hydroxide, and barium sulphate, which then is processed to form barium sulphide, which itself is carbonated to drive off $H_2S$ and form barium carbonate, which is recycled.

(c) U.S. Pat. No. 5,034,094 is concerned with a Kraft mill recovery process designed to increase mill capacity. Lignin first is removed from a portion of the black liquor, followed by inorganic components, which include sodium sulphate, with the residual black liquor then passing to the recovery furnace. The removed inorganics are said to be converted into a pulping chemical, namely sodium hydroxide. This is described as being effected by reacting the sodium sulphate with calcium oxide to form sodium hydroxide and calcium sulphate.

As will be apparent from the description below, none of this prior art discloses or suggests the procedure defined herein.

SUMMARY OF INVENTION

The process of the present invention seeks to alleviate the problem of pulp mill chemical imbalance as outlined above by converting sodium sulphate to sodium hydroxide. While the process of the invention is preferably effected in a pulp mill environment, in view of the benefits which flow therefrom, the process steps described herein may be effected in a stand-alone operation.

In one broad aspect of the invention, there is provided a process for the production of sodium hydroxide, which comprises converting sodium sulphate to sodium sulphide, converting sodium sulphide to sodium bicarbonate, and converting sodium bicarbonate to sodium hydroxide. The process also may be applied to other alkali metal sulphates to produce the corresponding alkali metal hydroxide. If desired, sodium bicarbonate and/or sodium carbonate may be recovered as the product of the process.

The sodium sulphate which may be processed in accordance with the present invention may arise from any convenient source. As mentioned above, one ready source in a pulp mill using chlorine dioxide bleaching is the by-product of chlorine dioxide production. Sodium sulphate by-product from other industrial processes may be used as well as sodium sulphate from any other source, such as natural sources. The sodium sulphate, which is processed herein may be in a neutral or acidic form.

One particular benefit of the procedure of the present invention when integrated with a pulp mill process is that the existing pulp mill configuration is retained and a minimal add-on of equipment is required to effect the process.

In accordance with embodiments of the invention, the present invention provides improvements in a pulp mill process for the production of pulp, which comprises digesting a cellulosic fibrous material in a pulping liquor comprising sodium sulphide and sodium hydroxide to form a pulp; separating the pulp from spent pulping liquor; and regenerating pulping liquor from the spent pulping liquor. In such improvements, sodium hydroxide is produced from sodium sulphate added to the spent pulping liquor in excess of any amount required to make-up soda and/or sulphur losses from the pulp mill process.

The added sodium sulphate is introduced to the pulping liquor regenerating operation prior to a smelt-forming step producing sodium sulphide and sodium carbonate. Alternative procedures then may be employed to form sodium hydroxide.

In a first alternative, a portion of the sodium sulphide in the smelt corresponding at least in part to the added sodium sulphate is converted to sodium bicarbonate, releasing hydrogen sulphide, and the sodium bicarbonate then is converted to sodium hydroxide.

In a second alternative, the smelt is subjected to fractionation to separate at least a portion of the sodium carbonate therefrom, at least a portion of the separated sodium carbonate is converted to sodium hydroxide, a portion of the sodium sulphide and any residual sodium carbonate in the smelt is converted to sodium bicarbonate, releasing hydrogen sulphide, and the sodium bicarbonate then is introduced into the regeneration operation.

By effecting the fractionation step, such as by selective leaching with water, so as to separate an amount of sodium carbonate which is in excess of the quantity desired to be converted to sodium hydroxide, then the overall lime requirement for causticization of sodium carbonate and sodium bicarbonate to sodium hydroxide is less than if just the quantity of sodium carbonate desired to be converted to sodium hydroxide is separated, since there is produced in the former case a lesser proportion of sodium carbonate associated with the sodium sulphide which is converted to sodium bicarbonate.

Fractionation of the smelt into a solid sodium carbonate product and an aqueous solution of sodium sulphide provides a relatively concentrated sodium sulphide solution. By manipulation of the proportion of overall sodium carbonate converted to sodium hydroxide by recausticization and dilution of the sodium sulphide solution, the sulphidity of the pulping liquor may be controlled over a wide range of values, as required by specific pulping circumstances.

The present invention is particularly useful in a pulp mill operation wherein the pulp is contacted with chlorine dioxide and sodium hydroxide in a bleach plant operation. In such a procedure, chlorine dioxide production is effected by a process which co-produces sodium sulphate. Sodium sulphate from the chlorine dioxide production is introduced into the pulping liquor regenerating operation prior to a smelt-forming step producing sodium sulphide and sodium carbonate in an amount in excess of any amount required to make-up soda and/or sulphur losses from the pulp mill process, the added sodium sulphate is converted to sodium hydroxide within the pulp mill process, and the sodium hydroxide so produced is used in the bleach plant operation as at least part of the sodium hydroxide employed therein.

The conversion of sodium sulphide to sodium bicarbonate, effected as a process step herein, generally results in the release of hydrogen sulphide. This hydrogen sulphide often is converted to sulphur by oxidation, such as by a Claus plant or other convenient procedure. Air employed in such an oxidation reaction may comprise a foul gas stream from elsewhere in the pulp mill, containing odiferous sulphur compounds and other contaminants, which also become converted to sulphur and other products in the oxidation step. A tail stream resulting from such oxidation may contain residual quantities of unconverted hydrogen sulphide and/or sulphur-based acidic material, which may be scrubbed from the tail gas stream by contact with a pulp mill liquor, such as white liquor or green liquor.

Accordingly, in a further aspect of the present invention, there is provided a kraft pulp mill process, which comprises oxidizing hydrogen sulphide in a gaseous stream thereof to sulphur and produce a tail gas stream containing residual quantities of unoxidized scrubbable sulphur-based acidic gas, which may include hydrogen sulphide, and scrubbing said tail gas stream free from said residual quantities of sulphur-based acidic gas, with an aqueous medium provided in said pulp mill process, particularly white liquor or green liquor.

Sulphur which is produced from hydrogen sulphide may be sold as such or converted to other useful chemicals, such as sulphuric acid. In one aspect of the invention, sulphur produced from oxidation of hydrogen sulphide is employed, at least in part, as an additive to pulping liquor to provide a proportion of sodium polysulphide in the pulping liquor.

In accordance with a yet further aspect of the invention, there is provided a further improvement in a pulp mill process for the production of pulp, comprising digesting a cellulosic material in a pulping liquor comprising sodium sulphide and sodium hydroxide to form a pulp, separating said pulp from spent pulping liquor, and regenerating pulping liquor from spent pulping liquor. The improvement in such procedure comprises oxidizing hydrogen sulphide arising in the pulp mill process, such as from conversion of sodium sulphide to sodium bicarbonate, to sulphur, and incorporating at least part of such sulphur in the regeneration operation to provide a proportion of sodium polysulphide in the pulping liquor.

DESCRIPTION OF PREFERRED EMBODIMENT

Figure 1:
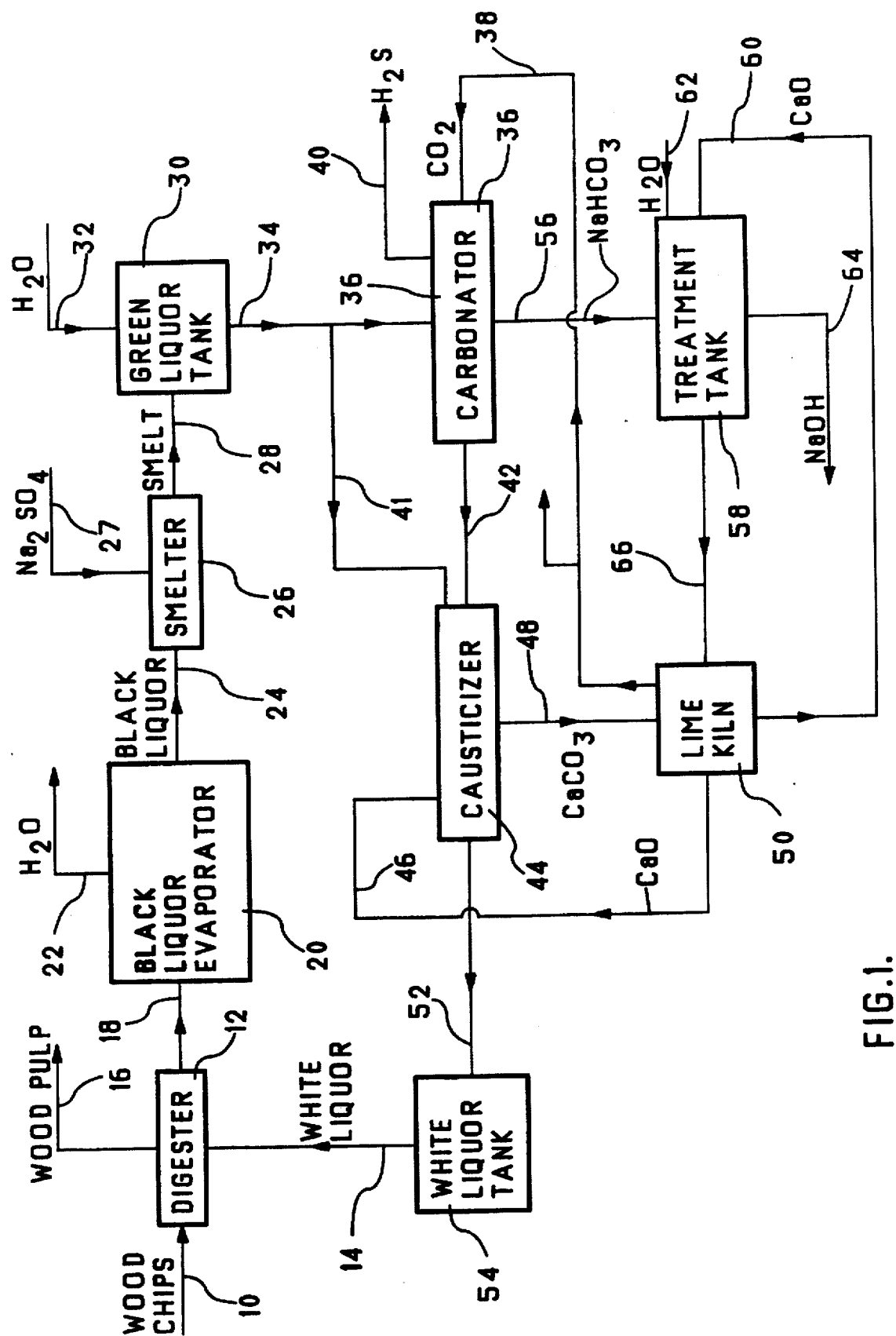
FIG. 1 is a schematic flow sheet of one embodiment of a pulp mill modified to effect the process of the invention.

Referring first to FIG. 1 of the drawings, wood chips or other cellulosic fibrous material is fed by line 10 to a kraft mill digester 12 wherein the wood chips are digested by white liquor fed by line 14 to form wood pulp. The wood pulp is removed from the digester 12 by line 16 and forwarded for further processing, such as bleaching. The wood pulp usually is separated from the spent pulping liquor by brown stock washing (not shown).

The spent pulping liquor, or black liquor, is forwarded from the digester 12 by line 18 to a black liquor evaporator 20. The black liquor is concentrated in the evaporator 20 and steam is removed from the evaporator by line 22. The concentrated black liquor is forwarded by line 24 from the black liquor evaporator 20 to a smelter 26, to which sodium sulphate is added by line 38 to make up sodium and/or sulphur losses from the system and in the amount desired to be converted to sodium hydroxide. Black liquor concentration and smelt formation may be combined into a single recovery boiler operation.

The black liquor first may be heated to effect a significant decrease in the viscosity of the black liquor, which facilitates further processing of the black liquor, as described, for example, in U.S. Pat. No. 4,929,307, the disclosure of which is incorporated herein by reference.

In the smelter 26, the black liquor, along with sodium sulphate added by line 27, is converted to a smelt comprising mainly sodium sulphide and sodium carbonate while the added sodium sulphate is converted to sodium sulphide, which is passed by line 28 to a green liquor tank 30, to which water is fed by line 32 to form green liquor from the smelt.

That portion of the green liquor that is to be converted to sodium hydroxide, or sodium bicarbonate, is passed by line 34 to a carbonator 36 wherein the green liquor is acidified by contact with carbon dioxide fed by line 38, which converts substantially all of the sodium sulphide and sodium carbonate present in the green liquor to sodium bicarbonate, which precipitates from the reaction medium, and gaseous hydrogen sulphide as a by-product. The by-product hydrogen sulphide is removed from the carbonator 36 by line 40. The sodium bicarbonate may be recovered as the product of the process, if desired.

The hydrogen sulphide so produced may be converted to sulphur by standard techniques, preferably by the process described in U.S. Pat. No. 4,919,914 as well as copending U.S. patent application Ser. No. 622,485 filed Dec. 5, 1990, U.S. patent application Ser. No. 863,720 filed Apr. 3, 1992 and U.S. patent application Ser. No. 709,158 filed Jun. 3, 1991, the disclosures of which are incorporated herein by reference, (herein referred to as Apollo Unit) or by a conventional Claus process as described below for the embodiments of FIGS. 2 and 3. In a Claus plant, hydrogen sulphide is converted to sulphur by a two-step operation requiring an initial combustion of a portion of the hydrogen sulphide in air to form sulphur dioxide and then reaction of th sulphur dioxide with the remainder of the hydrogen sulphide to form sulphur. Sulphur is a commodity chemical and may be sold as such, for conversion, if desired, to useful chemicals, such as sulphuric acid. The sulphur also may be used to provide a proportion of sodium polysulphide in the pulping liquor, by incorporating some or all of the sulphur into the regeneration cycle of the pulp mill.

Alternatively, or in combination, the hydrogen sulphide produced by conversion of sodium sulphide to sodium bicarbonate may be employed to effect sulphidity control with respect to the white liquor, as described more fully in copending U.S. patent application Ser. No. 887,004 filed May 22, 1992 now U.S. Pat. No. 5,326,433.

The remaining untreated portion of the green liquor is forwarded by line 41 and the treated green liquor, which contains some sodium bisulphide, then is passed by line 42, both to a causticizer 44, wherein the sodium carbonate and sodium bicarbonate contained in such streams are converted to sodium hydroxide and residual sodium bisulphide is converted to sodium sulphide by contact with slaked lime fed by line 46. Calcium carbonate formed in the causticizer 44 is removed as a solid phase by line 48, for passage to a lime kiln 50 for reconversion to lime for further causticization operations. The lime kiln 50 forms carbon dioxide off-gas, which may be used, in part, to provide the carbon dioxide feed 38 to the carbonator 36. The resulting white liquor is forwarded by line 52 to a white liquor tank 54, from where the white liquor is forwarded by line 14 to the digester 12.

After washing, the crystalline sodium bicarbonate is forwarded by line 56 to a treatment tank 58, wherein it is contacted with lime fed by line 60 from the lime kiln 50 and water fed by line 62 (i.e., slaked lime slurry) and converted to aqueous sodium hydroxide which is recovered by line 64. By-product calcium carbonate from this chemical conversion is forwarded by line 66 to the lime kiln 50 for conversion to lime.

Figure 2:
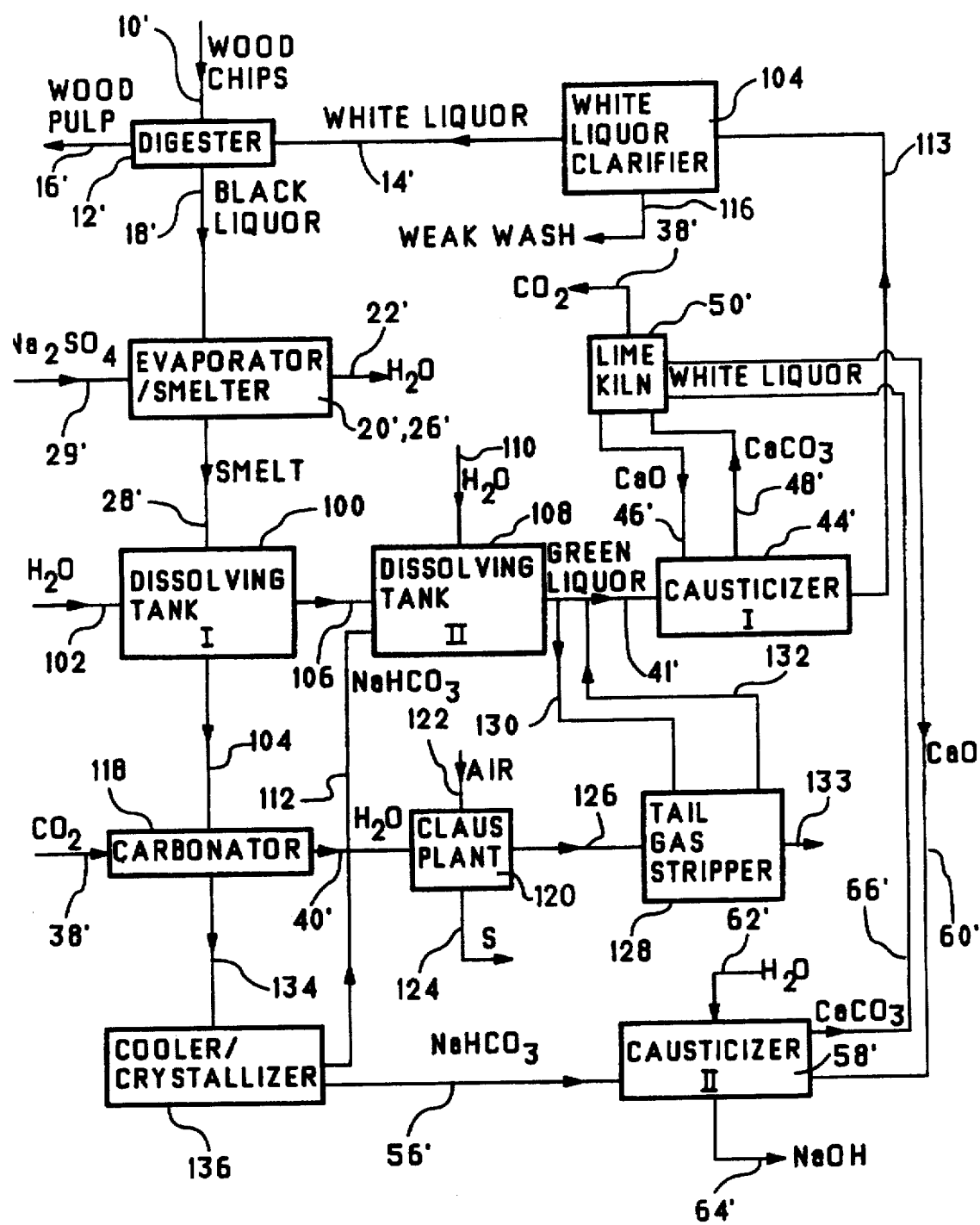
FIG. 2 is a schematic flow sheet of a second embodiment of a pulp mill modified to effect the process of the invention.
Figure 3:
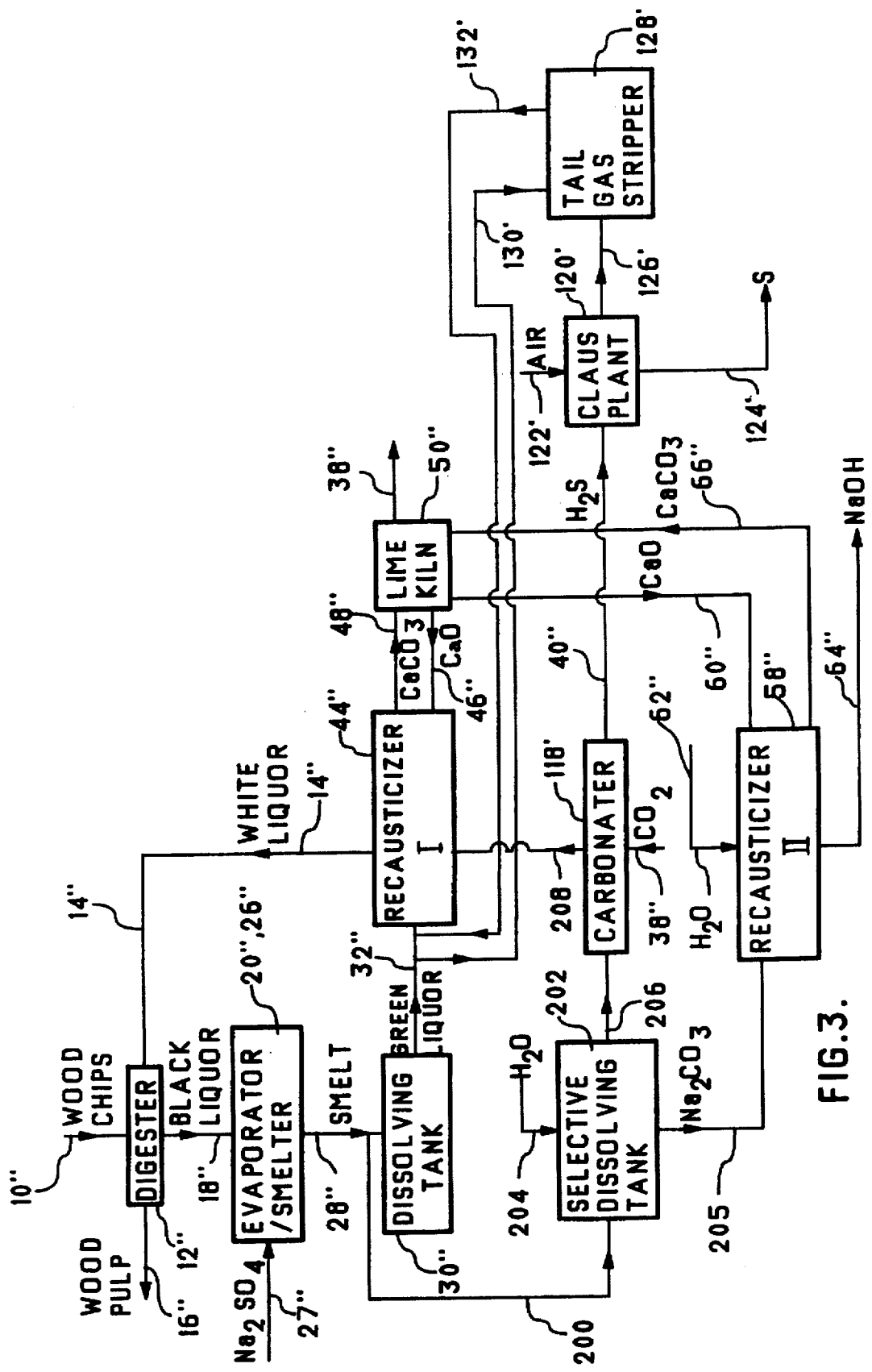
FIG. 3 is a schematic flow sheet of a third embodiment of a pulp mill modified to effect the process of the invention.
Figure 4:
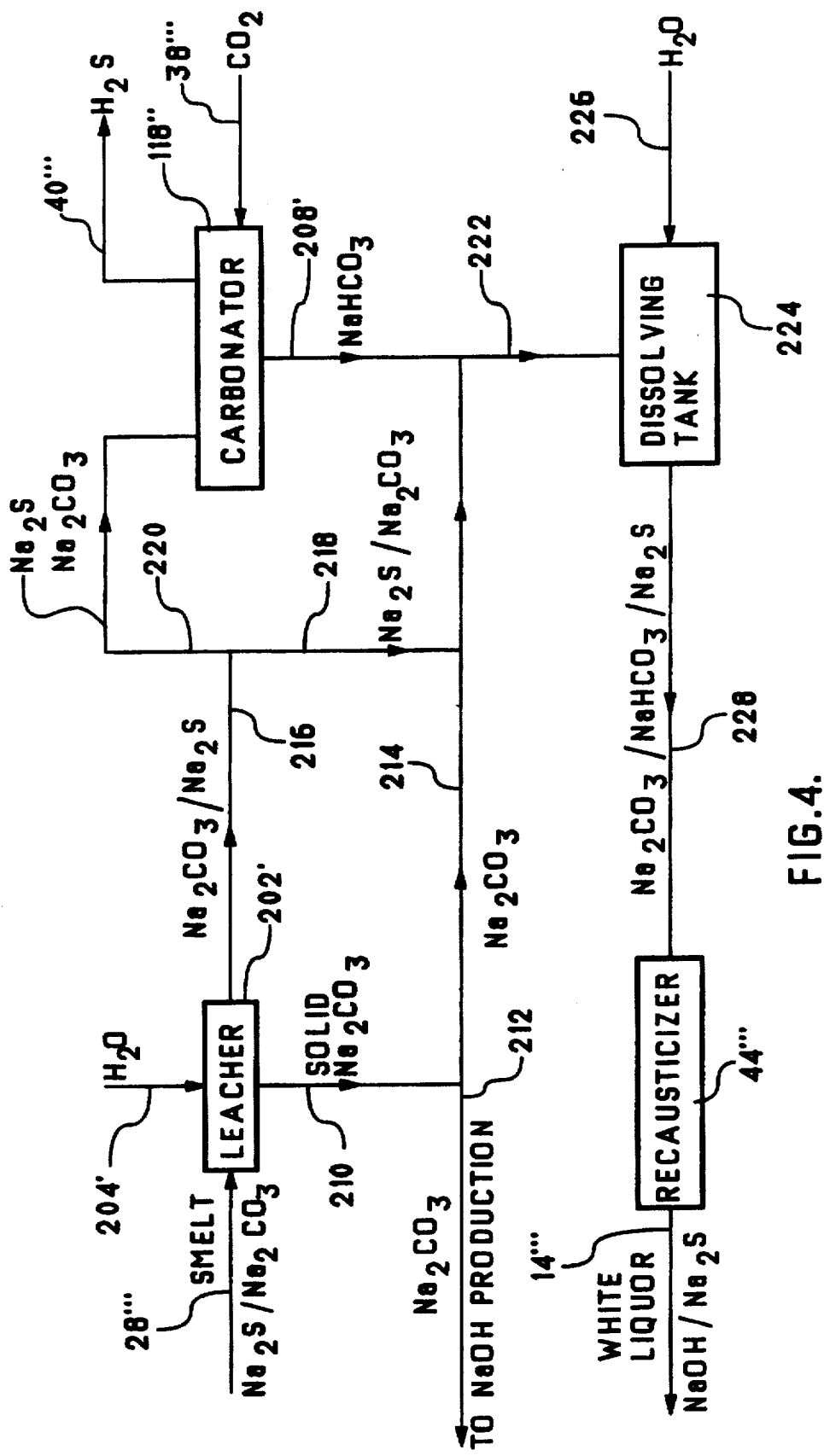
FIG. 4 is a schematic partial flow sheet of an alternative form of the procedure illustrated in FIG. 3.

In the procedure of FIG. 1, all the smelt from the spent pulping liquor recovery operation is converted into green liquor, the green liquor is separated into two streams, one of which is treated to form sodium bicarbonate from which sodium hydroxide is formed, while the other green liquor stream is processed in conventional manner. FIGS. 2 to 4 illustrate alternative procedures to that illustrated in FIG. 1, with the procedures of FIGS. 3 and 4 being preferred as leading to a decreased overall lime requirement for causticization, when compared to the procedures of FIGS. 1 and 2, as outlined below. Common reference numerals, primed, double-primed or triple-primed, are used in FIGS. 2 to 4 to designate items in common with the procedure of FIG. 1.

In FIG. 2, wood chips or other cellulosic fibrous material is fed by line 10' to a kraft mill digester 12' wherein the wood chips are digested by white liquor fed by line 14' to form wood pulp, which is removed from the digester 12' by line 16' and forwarded for further processing, such as bleaching.

The black liquor is forwarded from the digester 12' by line 18' to a recovery boiler 26' wherein the black liquor is evaporated and steam is removed by line 22'. The concentrated black liquor is smelted along with sodium sulphate added by line 27', in an amount sufficient to make-up soda and/or sulphur losses from the system and additionally corresponding to the amount to be converted to sodium hydroxide.

In the smelting operation, the black liquor, along with sodium sulphate added by line 27', is converted to a smelt comprising mainly sodium sulphide and sodium carbonate while the added sodium sulphate is converted to sodium sulphide. The smelt is passed by line 28' to a first dissolving tank 100, to which water is fed by line 102 in an amount to dissolve a portion only of the smelt corresponding to that portion from which sodium hydroxide is to be formed, to form a first green liquor stream in line 104. The water fed by line 102 may comprise weak wash water from white liquor clarification.

The undissolved remainder of the smelt is forwarded by line 106 to a second dissolving tank 108, wherein the smelt is dissolved in water fed by line 110 and recycle aqueous sodium bicarbonate solution in line 112, to form green liquor in line 41'. The green liquor in line 41' is passed to a causticizer 44', wherein the sodium carbonate and sodium bicarbonate content of the green liquor is converted to sodium hydroxide, while any residual sodium bisulphide is converted to sodium sulphide by contact with lime fed by line 46'. Calcium carbonate formed in the causticizer 44' is removed as a solid phase by line 48', for passage to a lime kiln 50' for reconversion to lime for further causticization operations. The lime kiln 50' produces carbon dioxide off-gas in line 38'. The resulting white liquor is forwarded by line 14' to the digester 12', after passing by line 113 through a white liquor clarifier 114, from which weak wash water is removed by line 116.

The green liquor in line 104 is passed to an carbonator 118 wherein the liquor is contacted with carbon dioxide provided, at least in part, by carbon dioxide in line 38' from the lime kiln 50', or form another source of carbon dioxide within the pulp mill. The acidification of the aqueous medium by carbon dioxide effects conversion of sodium sulphide and sodium carbonate to sodium bicarbonate, and gaseous hydrogen sulphide as a by-product.

The by-product gaseous hydrogen sulphide in line 40' is removed from the carbonator 118 and converted to sulphur by any convenient process, as enumerated above with respect to FIG. 1, for example, an Apollo Unit. As illustrated, the hydrogen sulphide in line 40' is forwarded to a Claus Plant 120 wherein the hydrogen sulphide is largely converted by air fed by line 122 to sulphur, which is recovered by line 124.

An added advantage of employing a Claus process for oxidation of the hydrogen sulphide to sulphur is the possibility of employing as the air stream effecting the oxidation a foul gas stream arising from the pulp mill process, such as a stream containing non-condensable gases, so that, at the same time as the hydrogen sulphide fed by line 40' to the Claus Plant 120 is oxidized to sulphur, the containments of the foul gas stream also are treated and removed. Such a foul gas stream also may be processed by an Apollo Unit separately or in conjunction with a Claus plant.

The sulphur produced in line 124 may be employed, at least in part, to provide a proportion of sodium polysulphide in the pulping liquor, by introducing such sulphur to the regeneration cycle at an appropriate location.

Any residual hydrogen sulphide or other sulphur-based acidic gas, such as sulphur dioxide, in a tail gas stream from the Claus Plant 120 in line 126 is removed in a tail gas stripper 128, wherein it is contacted with a portion of the green liquor, forwarded by line 130 and returned by line 132. Alternatively, the tail gas stream in line 126 may be recycled to the carbonator 118 or contacted with white liquor to scrub out residual hydrogen sulphide. The hydrogen sulphide-free gas stream is vented by line 133. As described above, the use of a pulp mill liquor to scrub a tail gas stream from a hydrogen sulphide oxidation process free from residual sulphur-based gases constitutes one aspect of the present invention.

From the carbonator 118, the aqueous solution is forwarded by line 134 to a cooler crystallizer 136 wherein the aqueous solution is cooled to result in crystallization of sodium bicarbonate. The residual aqueous sodium bicarbonate solution is forwarded by line 112 to the second dissolving tank 108 as part of the aqueous dissolving medium employed therein.

After washing, the crystalline sodium bicarbonate then is forwarded by line 56' to a second causticization tank 58' to which is fed by line 60' and water by line 62' and converted to aqueous sodium hydroxide which is recovered by line 64'. By product calcium carbonate from this chemical conversion is forwarded by line 66' to the lime kiln 50' for conversion to lime.

In the procedure of FIG. 3, part of the solid smelt in line 28" is forwarded by line 200 to a selective dissolving tank 202 to which water is fed by line 204 in an amount to selectively dissolve out from the smelt sodium sulphide in preference to sodium carbonate, which is left as a solid phase in line 205. The aqueous phase sodium sulphide solution containing some dissolved sodium carbonate resulting from the selective leaching or separation operation, is forwarded by line 206 to the carbonator 118', for processing as described above with respect to FIGS. 1 and 2. The sodium bicarbonate by-product is forwarded by line 200 to the recausticizer 44".

The solid phase sodium carbonate in line 200 is forwarded to the causticizer 38" to produce an aqueous phase of sodium hydroxide therefrom. Since sodium carbonate is causticized in this instance, twice as much sodium hydroxide is produced, on a molar basis, than is the case when sodium bicarbonate is processed to form sodium hydroxide, in accordance with the procedures of FIGS. 1 and 2. However, overall, the production of sodium hydroxide as product of the process and in generated pulping liquor is the same in each case.

An alternative to the procedure in which part of the smelt is subjected to selective leaching, as described above for FIG. 3, is illustrated in FIG. 4. In this alternative, fractionation of all the smelt in line 28" by water fed by line 204' to a leacher 202' to dissolve out all the sodium sulphide from the smelt, along with some sodium carbonate. This leaching operation or other suitable fractionation step, leaves a portion of the smelt as solid phase sodium carbonate. This solid phase sodium carbonate may be in an amount which corresponds to that to be converted to sodium hydroxide product. It is preferred, however, to effect the leaching in such manner as to dissolve out all the sodium sulphide from the smelt and leave solid phase sodium carbonate in an amount in excess of that required to be converted to sodium hydroxide product, since an overall decreased lime requirement results, as described below. This solid phase sodium carbonate is recovered from the leacher 202' by line 210.

The portion of the solid phase sodium carbonate in line 210 required to be converted to produce aqueous sodium hydroxide solution is removed by line 212 for processing as described above with respect to the sodium carbonate contained in line 205 in FIG. 3, while the remainder of the sodium carbonate, in line 214, eventually is recycled to the recausticizer 44''', as described below.

The aqueous sodium sulphide liquor resulting from the leacher 202' in line 216 is divided into a first stream 218 for passage to the recausticizer 44''' and a second stream 220 for feed to a carbonator 118''' wherein the sodium sulphide and sodium carbonate in stream 220 are treated by carbon dioxide fed by line 38''' to produce sodium bicarbonate and hydrogen sulphide. The proportion of the total sodium sulphide present in stream 216 which is processed as stream 220 in this manner generally corresponds to the quantity of excess sodium sulphate introduced to the recovery boiler of the pulp mill.

There is a quantity of sodium carbonate contained in stream 220, corresponding in weight ratio to sodium sulphide to that in stream 216. The sodium carbonate contained in stream 220 is converted, in the carbonator to sodium bicarbonate, which subsequently must be converted to sodium hydroxide by causticization. Since twice as much lime, on a molar basis, is required to convert sodium bicarbonate to sodium hydroxide as is required to convert sodium carbonate to sodium hydroxide, it follows that it is advantageous to minimize the quantity of sodium carbonate converted to sodium bicarbonate. In the procedure of FIG. 4, this result is achieved by recovery from the smelt more sodium carbonate than is needed for conversion to sodium hydroxide product and forming the excess sodium carbonate to recausticization. This procedure decreases the quantity of sodium carbonate in the sodium sulphide solution in line 216 and hence the amount which needs to pass through the carbonator, if the desired amount of sodium sulphide is to be processed.

The hydrogen sulphide resulting from the carbonation is removed by line 40''' and may be processed to form sulphur, as described above with respect to the embodiments of FIGS. 1 to 3. The sodium bicarbonate formed in the carbonator 118'' in line 208' is combined with the sodium carbonate in line 214 and the sodium sulphide and sodium carbonate in line 218 to form a feed stream 222 for a dissolving tank 224, wherein the components are dissolved in water fed by line 226 to form a feed stream 228 to the recausticizer 44''', wherein there is formed white liquor in line 14'''.

The leaching operation or other suitable fractionation procedure which is effected in the leacher 202' produces a stream 210 of solid sodium bicarbonate and an aqueous sodium sulphide solution in line 216 which is rather more concentrated than normally encountered in a pulp mill. By manipulations of these streams, it is possible to provide white liquor or a series of white liquors, with varying levels of sulphidity, to obtain benefits in the pulping operation.

As may be seen from the above description, sodium sulphate fed to the pulp mill recovery cycle is converted to sodium hydroxide and hydrogen sulphide by integration with conventional pulp mill recovery processes. The procedure enables the useful sodium hydroxide to be produced without co-production of chlorine, for by-product sodium sulphate from the production of chlorine dioxide to be usefully employed in the pulp mill environment, and/or hydrogen sulphide to be used for sulphidity control or conversion to elemental sulphur. Accordingly, a significant improvement in the utility of chemicals is achieved in the pulp mill environment by the procedures involved in the present invention.

EXAMPLES

Example 1

Based on solubility data determined experimentally and from the literature, a mass balance was determined for the embodiment of FIG. 2. The calculation was based on the formation of 1 ton of pulp. The mass balance is presented in the following Tables I and II:

TABLE I

MAIN RECOVERY CYCLE

| Stream | $Na_2S$ | NaOH | $Na_2CO_3$ | $Na_2SO_4$ (in-stream) | $Na_2SO_4$ (Make-up) | Water |
|---|---|---|---|---|---|---|
| Into recovery boiler (18') | 249 | 52 | 38 | 9 | 101 (as $Na_2O$) | 488 |
| From recovery boiler (28') | 348 | 0 | 556 | 10 | 101 | 0 |
| From dissolving tank II (108) | 310 | 113 | 564 | | | 6320 |
| Feed to recausticizer I (41') | 310 | 113 | 564 | | | 6320 |
| From recausticizer I (113) | 310 | 629 | 48 | | | 6320 |
| Digester feed (14') | 254 | 516 | 39 | | | 5182 |
| Clarifier bottoms (116) | 56 | 113 | 9 | | | 1138 |

TABLE II

NaOH RECOVERY

| Stream | $Na_2S$ | NaOH | $Na_2CO_3$ | $Na_2HCO_3$ | $H_2S$ | Water |
|---|---|---|---|---|---|---|
| From dissolving tank I (106) | 244 | 0 | 390 | 0 | 0 | |
| Bleed to carbonator (104) | 104 | 0 | 167 | 0 | 0 | 1421 |
| Carbonator | | | | | | |
| off gas (40') | 0 | 0 | 0 | 0 | 52 | |
| $CO_2$ feed (38') | 0 | 0 | 0 | 0 | 0 | |
| $NaHCO_3$ Stream (134) | 10 | 0 | 17 | 244 | 0 | 1312 |
| Washer (136) | | | | | | |
| recycle stream (112) | 10 | 0 | 17 | 149 | 0 | 1312 |
| crystalline $NaHCO_3$ (56) | 0 | 0 | 0 | 95 | 0 | |
| Recausticizer II (58') | | | | | | |
| Lime (60') | 0 | 0 | 0 | 172 (as CaO) | | |
| $CaCO_3$ (66') | 0 | 0 | 0 | 308 (as $CaCO_3$) | | |
| Product (64') | 0 | 81 | 14 | 0 | | |
| Tail gas stripper (128) | | | | | | |
| Green liquid bleed (130) | 93 | 34 | 169 | 0 | | |
| From Claus (126) | 0 | 0 | 0 | 0 | 10 | |
| return stream (132) | 93 | 34 | 169 | 0 | 10 | |
| vent stream (133) | 0 | 0 | 0 | 0 | 0 | |
| Claus Plant (120) | | | | | | |
| from acidifier (40') | 0 | 0 | 0 | 0 | 52 | |
| air (122) | 0 | 0 | 0 | 0 | 0 | 346 (air) |
| Sulphur (124) | 0 | 0 | 0 | 0 | 0 | 44 (S) |

As may be seen from the above Tables, 101 lb of excess sodium sulphate (as $Na_2O$) added to the recovery cycle produces 81 lb of NaOH (as $Na_2O$) and 14 lb $Na_2CO_3$ (as $Na_2O$). At the same time, 44 lb of sulphur is recovered. As noted above, these values are on the basis of production of 1 ton of pulp.

This mass balance illustrates the feasibility of the procedure for producing sodium hydroxide and sulphur products from excess sodium sulphate fed to the pulp mill operation. It is anticipated that improved recovery levels may be achieved through various manipulations of the materials involved in the processing steps.

Example II

Based on solubility data, an idealized mass balance was calculated for the embodiment of FIG. 4, wherein 100 lb/ton of pulp of $Na_2SO_4$ (as $Na_2O$) is added to the smelt forming operation and 100 lb/ton of $Na_2CO_3$ is removed from the recovery cycle to form sodium hydroxide product. The following Table III provides the mass balance, in lb. of material per ton of pulp.

TABLE III

|  | $Na_2S$ | $Na_2CO_3$ | $NaHCO_3$ | NaOH |
|---|---|---|---|---|
| Smelt (28''') | 400 | 700 | | |
| Solid $Na_2O_3$ (210) | | 250 | | |
| $Na_2CO_3$ to NaOH production (212) | | 100 | | |
| Leach solution (216) | 400 | 450 | | |
| Carbonator feed (220) | 100 | 112.5 | | |
| Carbonator product (208') | | | 212.5 | |
| Carbonator by-pass (218) | 300 | 337.5 | | |
| Solid $Na_2CO_3$ recycle (214) | | 150 | | |
| White liquor (14''') | 300 | | | 700 |

In the embodiment of FIG. 4, more sodium carbonate remains unleached from the smelt than is required to produce sodium hydroxide. In the scenario where only the quantity of sodium carbonate requiring conversion to sodium hydroxide remains unleached, then the quantity of sodium carbonate accompanying the 100 lb. of $Na_2S$ fed to the carbonator increases from 112.5 to 175 lb, thereby resulting in the generation of additional quantities of sodium bicarbonate, totaling 275 lb. This increases the lime requirement of the causticizer to produce the same overall quantity of white liquor, when compared to effecting leaching to leave more solid phase sodium carbonate than is required to form sodium hydroxide product.

SUMMARY OF DISCLOSURE

In summary of this disclosure, the present invention provides a novel process of converting sodium sulphate, or other alkali metal sulphate, to sodium hydroxide, or other corresponding alkali metal hydroxide, which has particular utility in correcting the chemical imbalance of pulp mills, along with sulphur. Modifications are possible within the scope of this invention.

What we claim is:

1. A pulp mill process for the production of pulp wherein added sodium sulphate is introduced in an amount in excess of any amount required to make up soda and/or sulphur losses from the pulp mill process and is converted to sodium hydroxide and hydrogen sulphide as products of said pulp mill process, which comprises:

(a) digesting a cellulosic fibrous material in a pulping liquor comprising sodium sulphide and sodium hydroxide to form a pulp and spent pulping liquor, (b) separating said pulp from said spent pulping liquor and feeding said spent pulping liquor to a spent pulping liquor regenerating operation to form a smelt comprising sodium sulphide and sodium carbonate, (c) introducing said added sodium sulphate to the spent pulping liquor regenerating operation prior to the smelt-forming step thereof, thus producing a smelt comprising sodium sulphide and sodium carbonate, (d) dissolving said smelt in water to form a smelt solution and dividing the smelt solution into a first smelt solution stream containing an amount of sodium sulphide corresponding to the molar amount of sodium ions and sulfur in said added sodium sulphate and a second smelt solution stream, (e) contacting said first smelt solution stream with a carbon-dioxide containing gas stream to convert said sodium sulphide corresponding to the molar amount of sodium ions and sulfur in said added sodium sulphate simultaneously to solid-phase crystalline sodium bicarbonate, mother liquor, spent carbon dioxide-containing gas stream, and hydrogen sulfide, (f) removing hydrogen sulfide from step (e) in gaseous admixture with said spent carbon dioxide-containing gas stream, (g) separating said solid-phase crystalline sodium bicarbonate from said mother liquor from said contacting step, (h) mixing said mother liquor following step (g) with said second smelt solution stream from step (d) to form a combined stream containing sodium sulphide and sodium carbonate, (i) converting sodium carbonate and any sodium bicarbonate in said combined stream to sodium hydroxide by contact of said combined stream with calcium oxide and water to coproduce solid phase calcium carbonate and thereby form a pulping liquor comprising sodium sulphide and sodium hydroxide, (j) removing said solid phase calcium carbonate from the pulping liquor, (k) recycling said pulping liquor from step (j) to said digesting step (a), (l) converting said sodium bicarbonate from step (g) to aqueous sodium hydroxide by contacting said sodium bicarbonate with calcium oxide and water to coproduce solid phase calcium carbonate, (m) removing solid phase calcium carbonate from the aqueous sodium hydroxide formed in step (l), (n) recovering said aqueous sodium hydroxide from step (m) as a product of the pulp mill process, (o) calcining solid phase calcium carbonate from the solid phase calcium carbonate removal steps (k) and (m) to calcium oxide and to coproduce a carbon dioxide containing gas stream, (p) forwarding said carbon dioxide containing gas stream from step (o), at least in part, to said sodium sulphide conversion step (e), and (q) forwarding said calcium oxide produced in step (o) to steps (i) and (l), whereby said added sodium sulphate is converted to produce aqueous sodium hydroxide and hydrogen sulfide while the balance of soda and sulfur values of the pulp mill process is maintained, said hydrogen sulfide is removed from the pulp mill process in a gas stream from calcination of calcium carbonate and the use of calcium oxide for recausticization to produce pulping liquor is minimized.

2. The process of claim 1 wherein said co-produced hydrogen sulphide is converted to sulphur.

3. The process of claim 2 wherein said hydrogen sulphide is converted to sulphur by oxidation and any residual hydrogen sulphide and/or other sulphur-based acid gas is scrubbed from a tail gas stream from said oxidation in a liquor from said pulp mill process.

4. The process of claim 3 wherein said oxidation is effected using air comprising a foul air stream arising from said pulp mill process.

5. The process of claim 3 wherein said liquor from said pulp mill process comprises green liquor or white liquor.

6. A pulp mill process for the production of pulp wherein added sodium sulphate is introduced in an amount in excess of any amount required to make up soda and/or sulphur losses from the pulp mill process and is converted to sodium hydroxide and hydrogen sulphide as products of said pulp mill process, which comprises:

(a) digesting a cellulosic fibrous material in a pulping liquor comprising sodium sulphide and sodium hydroxide to form a pulp and spent pulping liquor, (b) separating said pulp from said spent pulping liquor and feeding said spent pulping liquor to a spent pulping liquor regenerating operation to form a smelt comprising sodium sulphide and sodium carbonate, (c) introducing said added sodium sulphate to the spent pulping liquor regenerating operation prior to the smelt-forming step thereof, thus producing a smelt comprising sodium sulphide and sodium carbonate, (d) subjecting said smelt to fractionation by selectively dissolving all the sodium sulphide and a portion of said sodium carbonate from the smelt to form a leach solution of sodium sulphide and sodium carbonate and leave sodium carbonate in solid form in an amount corresponding to at least the molar quantity of sodium ions introduced by said added sodium sulphate, (e) converting at least a portion of said sodium carbonate in solid form and corresponding to the molar amount of said sodium ions introduced by said added sodium sulphate to aqueous sodium hydroxide and calcium carbonate solids by contacting said sodium carbonate with calcium oxide and water, (f) removing solid phase calcium carbonate from the aqueous sodium hydroxide, (g) recovering said aqueous sodium hydroxide from step (f) as a product of the pulp mill process, (h) introducing any residual solid phase sodium carbonate produced in step (e) to said spent pulping liquor regeneration operation, (i) converting a portion of said sodium sulphide in said leach solution of sodium sulfide formed in step (d) and corresponding to the molar amount of sulfur introduced by said added sodium sulphate simultaneously to sodium bicarbonate, spent carbon dioxide containing gas stream, and hydrogen sulfide by contacting said aqueous solution of sodium sulfide with a carbon dioxide containing gas stream, (j) removing hydrogen sulfide from step (i) in gaseous admixture with said spent carbon dioxide containing gas stream, (k) forming a combined stream comprising residual aqueous sodium sulphide solution from step (i), said sodium bicarbonate and the remaining portion of sodium carbonate in said smelt not converted to sodium hydroxide, (l) converting sodium carbonate and sodium bicarbonate in said combined stream to sodium hydroxide by contact of said combined stream with calcium oxide and water to coproduce solid phase calcium carbonate and thereby form a pulping liquor comprising sodium sulphide and sodium hydroxide, (m) removing said solid phase calcium carbonate from the pulping liquor, (n) recycling said pulping liquor from step (m) to said digesting step (a), (o) calcining solid phase calcium carbonate from the solid phase calcium carbonate removal steps (f) and (m) to calcium oxide and to coproduce a carbon dioxide containing gas stream, (p) forwarding said carbon dioxide containing gas stream from step (o), at least in part, to said sodium sulphide conversion step (i), and (q) forwarding said calcium oxide produced in step (o) to steps (e) and (l), whereby said added sodium sulphate is converted to product aqueous sodium hydroxide and hydrogen sulfide while the balance of soda and sulfur values of the pulp mill process is maintained, said hydrogen sulfide is removed from the pulp mill process in a gas stream from calcination of calcium carbonate and the use of calcium oxide for recausticization to produce pulping liquor is minimized.

7. The process of claim 6 wherein said portion of said sodium sulphide in said smelt is converted to sodium bicarbonate by converting to sodium bicarbonate a portion of the leach solution of sodium sulphide and sodium carbonate resulting from said selective dissolution corresponding to the molar amount of sulphur in said added sodium sulphate.

8. The process of claim 6 wherein said hydrogen sulphide is converted to sulphur.

9. The process of claim 8 wherein said hydrogen sulphide is converted to sulphur by oxidation and any residual hydrogen sulphide and/or other sulphur-based acid gas is scrubbed from a tail gas stream from said oxidation in a liquor from said pulp mill process.

10. The process of claim 9 wherein said oxidation is effected using air comprising a foul air stream arising from said pulp mill process.

11. The process of claim 9 wherein said liquor from said pulp mill process comprises green liquor or white liquor.

12. A pulp mill process for the production of pulp wherein added sodium sulphate is introduced in an amount in excess of any amount required to make up soda and/or sulphur losses from the pulp mill process and is converted to sodium hydroxide and hydrogen sulphide as products of said pulp mill process, which comprises:

(a) digesting a cellulosic fibrous material in a pulping liquor comprising sodium sulphide and sodium hydroxide to form a pulp and spent pulping liquor, (b) separating said pulp from said spent pulping liquor and feeding said spent pulping liquor regenerating operation to form a smelt comprising sodium sulphide and sodium carbonate, (c) introducing said added sodium sulphate to the spent pulping liquor regenerating operation prior to the smelt-forming step thereof, thus producing a smelt comprising sodium sulphide and sodium carbonate, (d) subjecting said smelt to fractionation by subjecting a portion of said smelt to selective dissolution of sodium sulphide therefrom in an amount corresponding to the molar amount of sulphur in said added sodium sulphate to form a first aqueous sodium sulphide solution and leave sodium carbonate in solid form and by dissolving the remaining portion of the smelt to form a second aqueous solution of sodium sulphide, (e) converting at least a portion of said sodium carbonate in solid form and corresponding to the molar amount of said sodium ions introduced by said added sodium sulphate to aqueous sodium hydroxide and calcium carbonate solids by contacting said sodium carbonate with calcium oxide and water, (f) removing solid phase calcium carbonate from the aqueous sodium hydroxide, (g) recovering said aqueous sodium hydroxide from step (f) as a product of the pulp mill process, (h) introducing any residual solid phase sodium carbonate produced in step (e) to said spent pulping liquor regeneration operation, (i) converting the dissolved sodium sulphide in said first aqueous solution of sodium sulphide formed in step (d) and corresponding to the molar amount of sulphur introduced by said added sodium sulphate simultaneously to sodium bicarbonate, spent carbon dioxide containing gas stream, and hydrogen sulphide by contacting said aqueous solution of sodium sulphide with a carbon dioxide containing gas stream, (j) removing hydrogen sulphide from step (i) in gaseous admixture with said spent carbon dioxide containing gas stream, (k) forming a combined stream comprising residual aqueous sodium sulphide solution from step (i), said sodium bicarbonate and the remaining portion of sodium carbonate in said smelt not converted to sodium hydroxide and contained in said second aqueous solution of sodium sulphide, (l) converting sodium carbonate and sodium bicarbonate in said combined stream to sodium hydroxide by contact of said combined stream with calcium oxide and water to coproduce solid phase calcium carbonate and thereby form a pulping liquor comprising sodium sulphide and sodium hydroxide, (m) removing said solid phase calcium carbonate from the pulping liquor, (n) recycling said pulping liquor from step (m) to said digesting step (a), (o) calcining solid phase calcium carbonate from the solid phase calcium carbonate removal steps (f) and (m) to calcium oxide and to coproduce a carbon dioxide containing gas stream, (p) forwarding said carbon dioxide containing gas stream from step (o), at least in part, to said sodium sulphide conversion step (i), and (q) forwarding said calcium oxide produced in step (o) to steps (e) and (l), whereby said added sodium sulphate is converted to product aqueous sodium hydroxide and hydrogen sulphide while the balance of soda and sulphur values of the pulp mill process is maintained, said hydrogen sulphide is removed from the pulp mill process in a gas stream from calcination of calcium carbonate and the use of calcium oxide for recausticization to produce pulping liquor is minimized.

13. The process of claim 12 wherein said portion of said sodium sulphide in said smelt is converted to sodium bicarbonate by converting the dissolved sodium sulphide in said first aqueous sodium sulphide solution from said selective dissolution to sodium bicarbonate.

* * * * *